United States Patent
McKenzie et al.

(10) Patent No.: US 10,989,513 B2
(45) Date of Patent: Apr. 27, 2021

(54) MEASURING TAPE WITH INCREASED CUPPING

(71) Applicant: APEX BRANDS, INC., Apex, NC (US)

(72) Inventors: Timothy T. McKenzie, Westminster, MD (US); Eric Broadaway, New Freedom, PA (US)

(73) Assignee: APEX BRANDS, INC., Apex, NC (US)

( * ) Notice: Subject to any disclaimer, the term of this patent is extended or adjusted under 35 U.S.C. 154(b) by 0 days.

(21) Appl. No.: 16/650,559

(22) PCT Filed: Sep. 26, 2018

(86) PCT No.: PCT/US2018/052846
§ 371 (c)(1),
(2) Date: Mar. 25, 2020

(87) PCT Pub. No.: WO2019/067531
PCT Pub. Date: Apr. 4, 2019

(65) Prior Publication Data
US 2020/0326171 A1    Oct. 15, 2020

Related U.S. Application Data

(60) Provisional application No. 62/563,343, filed on Sep. 26, 2017.

(51) Int. Cl.
*G01B 3/1003* (2020.01)
*B24C 1/10* (2006.01)
*B24C 3/12* (2006.01)
*G01B 3/10* (2020.01)

(52) U.S. Cl.
CPC ............. *G01B 3/1003* (2020.01); *B24C 1/10* (2013.01); *B24C 3/12* (2013.01); *G01B 2003/1058* (2013.01)

(58) Field of Classification Search
CPC ................ G01B 3/1003; G01B 2003/1058; B24C 1/10; B24C 3/12
USPC ................................................. 33/757; 72/53
See application file for complete search history.

(56) References Cited

U.S. PATENT DOCUMENTS

| | | | |
|---|---|---|---|
| 2,956,795 | A | 10/1960 | Foster |
| 3,073,022 | A | 1/1963 | Bush et al. |
| 3,482,423 | A | 12/1969 | Murray et al. |
| 4,429,462 | A | 2/1984 | Rutty et al. |
| 5,791,009 | A | 8/1998 | McComber et al. |

(Continued)

OTHER PUBLICATIONS

International Seach Report and Written Opinion of international application No. PCT/US2018/052846 dated Dec. 4, 2018, all enclosed pages cited.

*Primary Examiner* — Christopher W Fulton
(74) *Attorney, Agent, or Firm* — Burr & Forman, LLP (57) ABSTRACT

A method of producing a measuring tape may include providing a cupped blade with substantially uniform cupping over a longitudinal length of the cupped blade, applying a stress relief operation to a selected portion of only a convex side of the cupped blade to increase curvature of the cupped blade in the selected portion of the cupped blade, and operably coupling the cupped blade to a reel assembly and providing the cupped blade and reel assembly within a housing to define the measuring tape device.

13 Claims, 5 Drawing Sheets

(56) References Cited

U.S. PATENT DOCUMENTS

| | | | |
|---|---|---|---|
| 6,324,769 B1* | 12/2001 | Murray | G01B 3/1003 33/755 |
| 6,410,884 B1 | 6/2002 | Heckel et al. | |
| 6,473,986 B1* | 11/2002 | Sun | G01B 3/1003 33/757 |
| 2002/0129509 A1* | 9/2002 | Evans, III | G01B 3/1003 33/757 |
| 2003/0172539 A1* | 9/2003 | Lee | G01B 3/1003 33/757 |
| 2006/0059703 A1* | 3/2006 | Hernandez, Jr. | G01B 3/1003 33/757 |
| 2008/0010847 A1* | 1/2008 | Liao | G01B 3/1003 33/757 |
| 2020/0278189 A1* | 9/2020 | McKenzie | G01B 3/1003 |

* cited by examiner

MEASURING TAPE WITH INCREASED CUPPING

CROSS REFERENCE TO RELATED APPLICATION

This application claims priority to U.S. application No. 62/563,343 filed Sep. 26, 2017, the entire contents of which are incorporated by reference in its entirety.

TECHNICAL FIELD

Example embodiments generally relate to measuring tape devices, and particularly relate to a measuring tape that has increased cupping and a method for producing the same.

BACKGROUND

Measuring tapes have been around for a very long time, and are common measuring tools used in numerous contexts to obtain linear measurements. Measuring tapes can come in many forms and may be made of cloth, fiber glass, metal, plastic, or the like. The materials used are often dictated by the specific measuring application. For example, tailors and dressmakers typically use a flexible tape that can be easily manipulated between two hands to measure a distance therebetween. However, for construction or carpentry applications, a stiff and often metallic tape is preferred to allow the measuring tape to be extended between an a first location at which one end of the tape is anchored, and the location of the user at whose location the measuring tape is paid out from a reel assembly. The reel assembly may have a manual retracting mechanism or a self-retracting mechanism, typically depending upon the length of the measuring tape. For relatively short measuring tapes (e.g., 12 ft or 25 ft), self-retracting mechanisms are very common. For very long measuring tapes (e.g., larger than 100 ft), a manual retracting mechanism is typically employed.

For nearly a century, metallic tape ribbons with a curved (or cupped) and relatively stiff construction have been preferred for use in self-retracting measuring tapes. The metallic tape ribbon tends to be flexible enough to permit the metallic tape ribbon to be wound onto a spring loaded reel assembly, but stiff enough to have a relatively long standout. The cupping of the metallic tape ribbon further enhances the standout without negatively impacting the ability of the metallic tape ribbon to be wound onto the reel assembly. By employing an end hook at one end of the tape, the user may take advantage of the standout to pay out the measuring tape toward an anchor point on a media that is to be measured and then conduct the measurement without having to physically move to the anchor point to affix the end hook and then move away to make the measurement. Given the time and energy that can be saved by this method of measurement, taking advantage of the standout characteristics of a self-retracting measuring tape is a very popular feature.

Invariably, each measuring tape will have a certain length that effectively defines the maximum standout that can be achieved before the tape bends and effectively collapses. The measuring tape can no longer be extended reliably toward the anchor point once this collapse occurs. However, many users would prefer to reattempt to reach the anchor point, sometimes numerous times, than to physically move to the anchor point and attach the end hook to the anchor point. Thus, having a superior standout could be a powerfully attractive feature for a measuring tape.

BRIEF SUMMARY OF SOME EXAMPLES

Some example embodiments may enable the provision of a longer than normal standout for a measuring tape by providing increased cupping of at least a segment of a blade portion of the measuring tape. Thus, for example, user experience associated with use of the measuring tape may be improved.

In an example embodiment, a measuring tape device is provided. The measuring tape device may include a housing having an aperture, a reel assembly, and a cupped blade having a first end configured to extend from the housing through the aperture and a second end configured to be wound on the reel assembly. The cupped blade may have a first amount of cupping over a selected portion of a longitudinal length of the cupped blade, and a second and different amount of cupping over other portions of the cupped blade. A stress relief operation may be applied to the selected portion on only a convex side of the cupped blade to cause the first amount of cupping to be larger than the second amount of cupping.

In another example embodiment, a method of producing a measuring tape is provided. The method may include providing a cupped blade with substantially uniform cupping over a longitudinal length of the cupped blade, applying a stress relief operation to a selected portion of only a convex side of the cupped blade to increase curvature of the cupped blade in the selected portion of the cupped blade, and operably coupling the cupped blade to a reel assembly and providing the cupped blade and reel assembly within a housing to define the measuring tape device.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

FIG. 6, which is defined by FIGS. 6A and 6B, illustrates a shot peening assembly in accordance with an example embodiment;

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Figure 1:
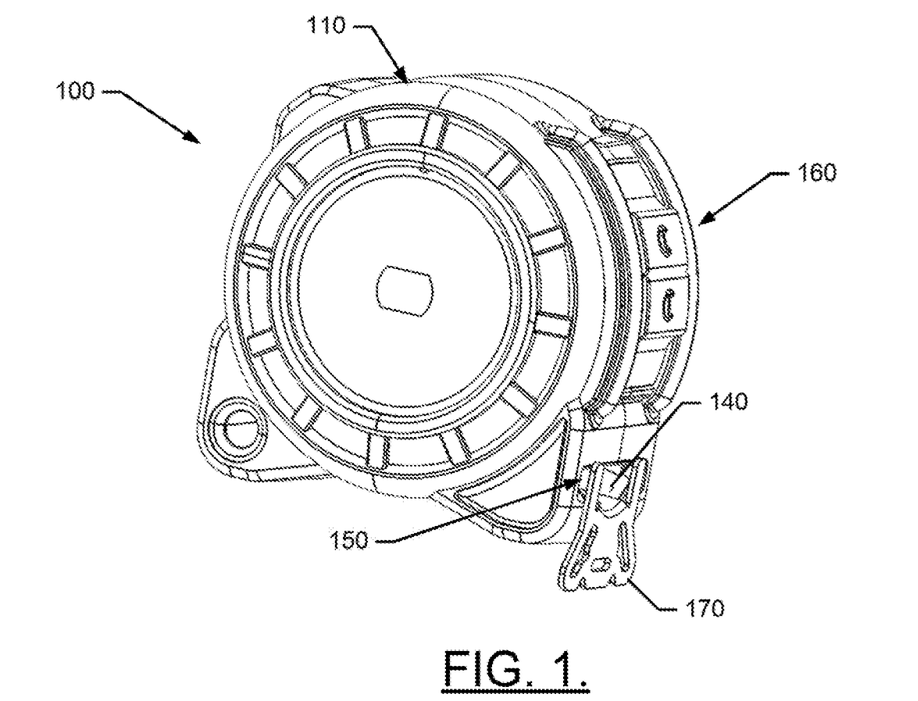
FIG. 1 illustrates a perspective view of a measuring tape device in accordance with an example embodiment.

As indicated above, some example embodiments may relate to the provision of a measuring tape device that may have an improved blade standout. This may be accomplished by employing increased cupping over at least a segment of the blade at a critical region or zone. However, the increased cupping could alternatively be applied over the entire length of the blade in some cases. FIG. 1 illustrates a perspective view of a measuring tape device, and FIG. 2 illustrates a block diagram of such device, in accordance with an example embodiment.

Figure 2:
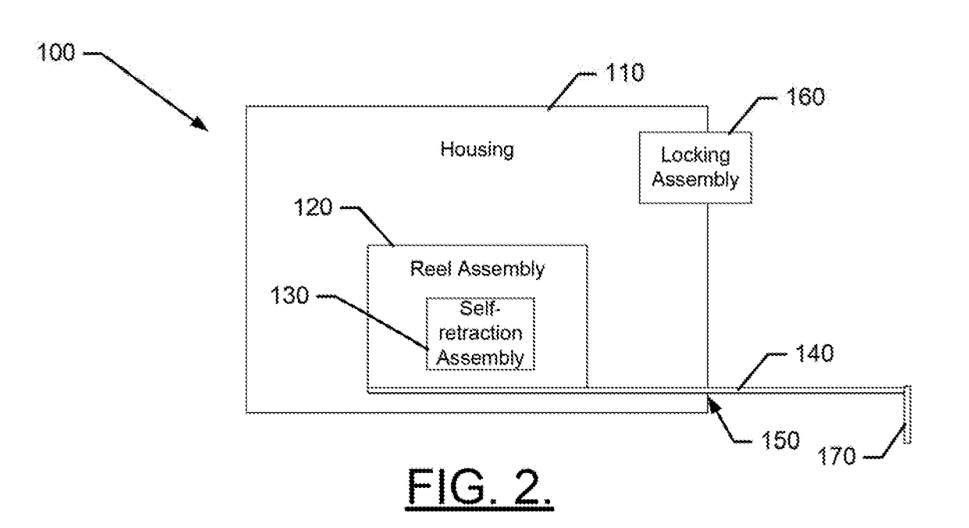
FIG. 2 illustrates a block diagram of the measuring tape device in accordance with an example embodiment.

Referring now to FIGS. 1 and 2, a measuring tape device 100 of an example embodiment may include a housing 110 inside which a reel assembly 120 and a self-retraction assembly 130 may be provided. A blade 140 (or tape) portion of the device 100 may be wound onto the reel assembly 120. The blade 140 may be paid out through an aperture 150 formed in the housing 110. Although not required, in some cases, a locking assembly 160 may be provided to enable the reel assembly 120 to be locked to prevent the self-retraction assembly 130 from retracting the blade 140 when the locking assembly 160 is engaged.

The blade 140 has an end hook 170 disposed at one end thereof, and is affixed to the reel assembly 120 at the other end of the blade 140. The end hook 170 may be affixed (temporarily) to an anchor point on a medium that is to be measured. Once the end hook 170 is affixed to the anchor point, the blade 140 may be paid out of the aperture 150 and unwound from the reel assembly 120. When a desired length of the blade 140 has been paid out, the user can make any necessary markings, readings, etc., associated with measuring scale markings that may be printed on the blade 140. The measuring scale markings generally measure length from the end hook 170 in one or more units, with divisions and subdivisions of such units clearly marked on the blade 140.

By fixing the end hook 170 to the anchor point, the self-retraction assembly 130 (which may be spring loaded in some cases) may be prevented from retracting the paid out portions of the blade 140 into the housing 110 (via the aperture 150). Similarly, when the locking assembly 160 is engaged, a force (e.g., a pinching force) may be placed on the blade 140 to prevent retraction or motion of the reel assembly 120 may otherwise be inhibited to prevent the self-retraction assembly 130 from retracting the paid out portions of the blade 140. However, when the end hook 170 is not anchored and the locking assembly 160 is not engaged, the self-retraction assembly 130 may cause the reel assembly 120 to wind the blade 140 back onto the reel assembly 120.

As mentioned above, for a typical measuring tape, when the blade 140 is paid out through the aperture 150, the blade 140 will extend relatively straight out the aperture 150 (although some sagging or droop may be noticed due to the weight of the blade 140). The blade 140 can be extended in a guided fashion toward an intended target anchor point while the blade 140 continues to have sufficient rigidity to standout. The blade 140 will continue to extend and standout until the weight of the blade 140 extended past the aperture 150 is sufficient to cause the blade 140 to collapse and bend, thereby losing its rigidity and preventing any further guided extension. The loss of sufficient rigidity which causes collapse and bending of the blade 140 generally occurs at a portion of the blade 140 that can be referred to as a "critical region" since it can occur at slightly different points (but generally in the same region) on different extension operations.

A typical blade may be made to have the same width and height (or thickness), and same amount of cupping across its entire length. However, it may be possible to increase the standout capabilities of the blade 140 by changing certain characteristics of the blade 140 at certain strategic locations along the length of the blade 140. For example, the cupping may be increased over an area covering or otherwise proximate to the critical region of the blade 140 to enable the blade 140 to retain its rigidity and avoid collapsing to achieve greater standout. There may be a number of ways to achieve the capability for greater standout using increased cupping strategies. One such way may include the application of pressure along lateral edges of a portion of the blade 140 (presumably near the critical region). For example, two long and straight walls may be provided on opposing sides of the blade 140 after the blade 140 has initially been treated to provide cupping that is common to most blades (by whatever method chosen). The two long and straight walls may then be moved toward each other to bend the blade 140 even more than the cupping that was already provided. In other words, the degree of cupping or amount of curvature may be increased over the range that the two long and straight walls contact the lateral edges of the blade 140.

The increased curvature or cupping of the blade 140 provided by the two long and straight walls may, however, have a positive impact on standout, but may create other problems. For example, a distinct transition point where a prompt jump occurs between portions of the blade 140 having two different degrees of curvature or cupping may be formed at the point at which each of the two long and straight walls terminated. Thus, four distinct transition points (two on each side of the blade 140 separated from each other by the length of the two long and straight walls) may be formed on the blade 140. These distinct transition points may get stuck on the aperture 150 during reeling of the blade 140 by the reel assembly 120. Transitions of this nature are also likely to increase the tendency of the blade 140 to "roll" and break when the blade 140 is extended substantially vertically (as opposed to the typical extension horizontally). Thus, it may be desirable to find a way to increase cupping that does not result in prompt jump changes in curvature of the blade 140. Other advantages may also be achieved by increasing cupping in other ways. The examples of FIGS. 3-9 will now be discussed to illustrate some of examples of alternative ways of increasing cupping of the blade 140.

Figure 3:
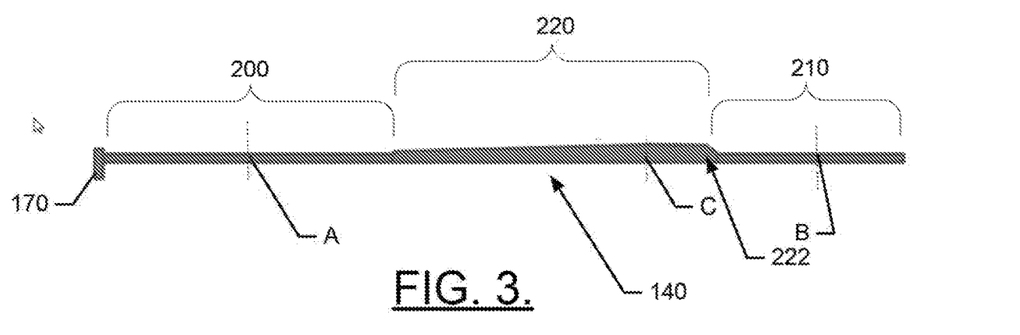
FIG. 3 illustrates a longitudinal cross section view of a blade portion of a measuring tape device in accordance with an example embodiment.
Figure 4:
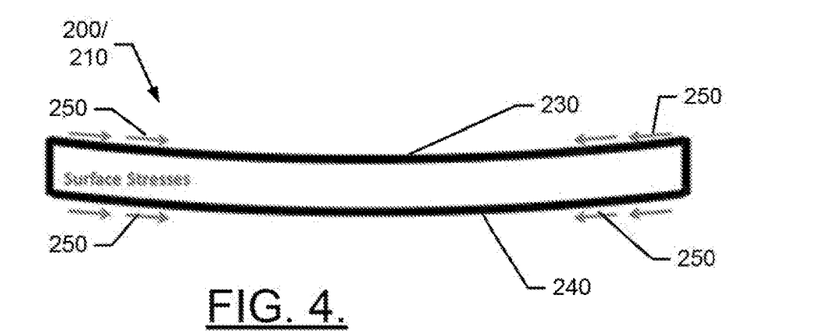
FIG. 4 illustrates a transversal cross section view of the blade portion of the measuring tape device outside a critical region in accordance with an example embodiment.
Figure 5:
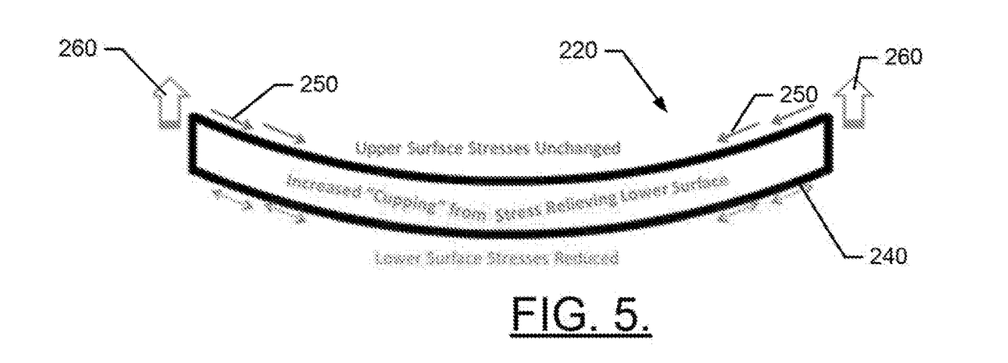
FIG. 5 illustrates a transversal cross section view of the blade portion of the measuring tape device at the critical region in accordance with an example embodiment.
Figure 6A:
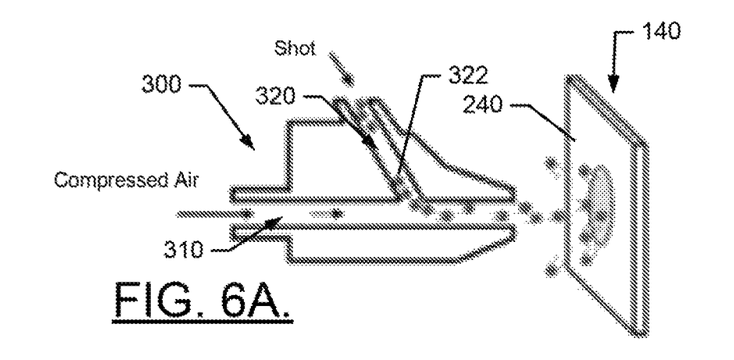
Figure 6B:
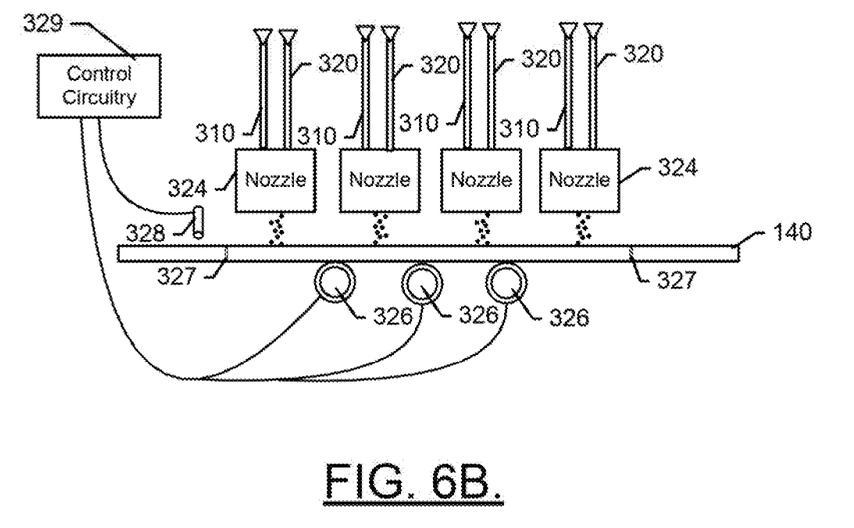
Figure 7:
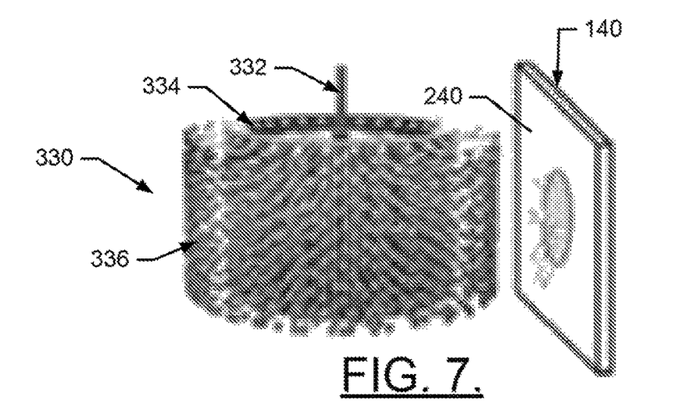
FIG. 7 illustrates a bead brush assembly for performing cold working of one side of the blade in accordance with an example embodiment.
Figure 8:
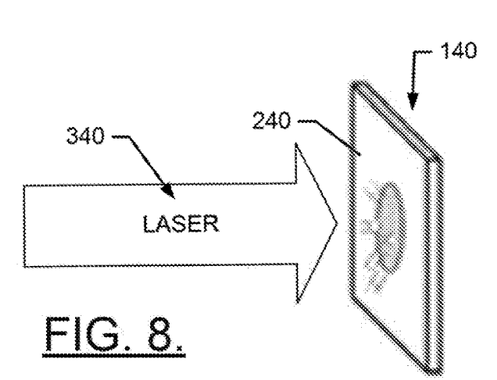
FIG. 8 illustrates a laser etching assembly for relieving residual surface stress on one side of the blade in accordance with an example embodiment.
Figure 9:
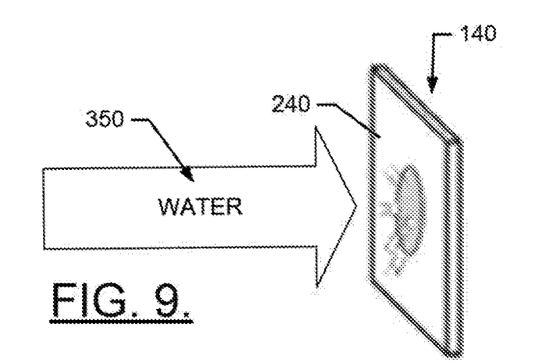
FIG. 9 illustrates a water blasting assembly for relieving residual surface stress on one side of the blade in accordance with an example embodiment.

In this regard, FIG. 3 illustrates a longitudinal cross section view of the blade 140 to facilitate the definition of various regions of the blade 140, and to show one particular example embodiment for improving standout of the blade 140. FIG. 4 illustrates a transversal cross section view of the blade 140 of FIG. 3, taken at either point A or point B of FIG. 3 (or taken at point C prior to the application of stress relief operations as described herein). FIG. 5 illustrates a transversal cross section view of the blade 140 of FIG. 3 taken at point C (i.e., within the critical region) after stress relief operations in accordance with one example embodiment. FIG. 6, which is defined by FIGS. 6A and 6B, illustrates two implementations for a first way of achieving increased cupping in the critical region by providing stress relief to a convex side of the blade 140 using shot peen cold working in accordance with an example embodiment. FIG. 7 illustrates a second way of achieving increased cupping in the critical region by providing stress relief to the convex side of the blade 140 using bead brush cold working in accordance with an example embodiment. FIG. 8 illustrates a third way of achieving increased cupping in the critical region by providing stress relief to the convex side of the blade 140 using laser etching in accordance with an example embodiment. FIG. 9 illustrates a fourth way of achieving increased cupping in the critical region by providing stress relief to the convex side of the blade 140 using water blasting in accordance with an example embodiment.

Referring now to FIGS. 3-9, it can be appreciated that the blade 140 may include a first non-critical region 200 disposed proximate to a first end of the blade 140 and a second non-critical region 210 disposed proximate to a second end of the blade 140. The first end of the blade 140 may extend from the end hook 170 to a start of a critical region 220. The critical region 220 may then extend to meet the second non-critical region 210. The second non-critical region 210 may then extend from the critical region 220 to the second end of the blade 140. Thus, the critical region 220 is disposed between the first and second non-critical regions 200 and 210.

In some cases, the critical region 220 may be disposed spaced apart from the end hook 170 by at least a particular distance that is determined based on a combination of factors including width of the blade 140, material used to form the blade 140, amount of cupping of the blade 140, thickness of the blade 140, etc. Thus, the critical region 220, which is a range of locations along the longitudinal length of the blade 140, may slide closer to or farther from the end hook 170 with different combinations of the above listed factors, and may expand in size based on the different combinations of the above listed factors. For most common sizes of measuring tape devices, the critical region 220 may lie in a range between about 8 feet to about 15 feet from the end hook 170. However, other ranges are possible. Table 1 below shows a number of dimensions associated with blades that have been processed using one of the methods of stress relief described below (i.e., shot peening) to show examples of how the factors described above may impact the critical region 220, and standout that can be achieved by treating the critical region 220 using the techniques described herein.

TABLE 1

Example blade 1

Blade thickness @ 6': .0055 in
Blade Width: 1.00"

TABLE 1-continued

Shot peened: 77.5 in-136 in
Standout: 129 in
Example blade 2

Blade thickness @ 6': .0065 in
Blade Width: 1.1875"
Shot peened: 107.25 in-162.5 in
Standout: 155
Example blade 3

Blade thickness @ 6': .0055 in
Blade Width: 1.00"
Shot peened: 83 in-163 in
Standout: 128
Example blade 4

Blade thickness @ 6': .006 in
Blade Width: 1.1875"
Shot peened: 107.5 in-162 in
Standout: 139
Example blade 5

Blade thickness @ 6': .006
Blade Width: 1.1875"
Shot peened: 108 in-162 in
Standout: 138

In an example embodiment, an amount of curvature or cupping of the blade 140 in the first and second non-critical regions 200 and 210 may be less than the amount of curvature or cupping of the blade 140 in the critical region 220. By increasing the degree or amount of cupping in the critical region 220 relative to the degree or amount of cupping in the first and second non-critical regions 200 and 210, the critical region 220 may be more likely to maintain rigidity and avoid collapse on payout of the blade 140 through the critical region 220. The blade 140 may therefore have a longer standout. However, the increased cupping provided in the critical region 220 may be accomplished via a stress relief operation that may be easier to employ and avoid the formation of distinct or prompt jump-type transition points on the blade 140, which would result from mechanical bending operations. In this regard, a transition zone 222 may be defined between the critical region 220 and its intersection with the first and second non-critical regions 200 and 210. In some cases, an amount of cupping in the transition zone may change relatively slowly and/or evenly from the amount of cupping in the first and second non-critical regions 200 and 210 to the amount of cupping in the critical region 220 (e.g., 20% higher than cupping in the non-critical regions). For example, the transition zone may be greater than half an inch long to avoid any prompt jumps in cupping degree along the blade 140.

Referring to FIG. 4, it should be appreciated that when cupping is performed on the blade 140 (e.g., over the entire length of the blade 140), the cupping creates surface stresses on both a concave side 230 and a convex side 240 of the blade 140. The concave side 230 is generally the top side when the blade 140 is used for measuring a medium, and generally has measurement markings disposed thereon. The concave side 230 may be expected to face away from the medium being measured. The convex side 240 is typically the bottom side when the blade 140 is used for measuring, and lies next to the medium being measured. As shown in FIG. 4, the concave side 230 and the convex side 240 may have substantially matching degrees of concavity and convexity, respectively. In other words, the amount of curvature or cupping in the transverse direction is substantially the same for both the concave side 230 and the convex side 240 although one side is curved inward and the other outward.

The curvature or cupping of the blade 140 may be provided during the production process to generate the two substantially equal degrees of curvature, and corresponding surface stresses as shown by arrows 250 in FIG. 4. In this regard, the production process may include, for example, heating a metallic sheet material that has been cut to the desired width and then drawing the material through a structure that forms the drawn material to have the cupped transverse cross section. This cupped structure may then be cooled and tempered, resulting in the surface stresses shown in FIG. 4.

Working a surface of a material such as metal using certain processes that relieve the tensile stresses (e.g., residual surface stresses) on the surface can modify the mechanical properties of the metals in potentially positive ways. For example, relieving the tensile stresses on metallic surfaces (including replacement of tensile stresses with compressive stresses) can strengthen the materials. In some cases, the stress relief operations cause surface materials to be spread plastically to change mechanical properties of the surface to replace tensile stress with compressive stress. Such plastic deformation may also alter the shape of the surface that is plastically deformed. Moreover, in a case where opposing surfaces are treated differently (e.g., where one surface is plastically deformed to relieve tensile stresses and the opposing surface is not), a bending of the material between the surfaces may result. Referring to FIG. 5, lowering tensile stresses on the surface of the convex side 240, while not altering stresses on the surface of the concave side 230 may cause increased cupping in the critical region 220 (as shown by arrows 260).

The working of the surface of the convex side 240 of the blade 140 in the critical region 220 may be accomplished via a number of different methods. For example, as shown in FIG. 6A, a shot peening assembly 300 may be used to cold work the convex side 240 of the blade 140 (at least in the critical region 220). The shot peening assembly 300 may include a high pressure air line 310 and a shot line 320 that enables shot 322 entering a pressurized air stream from the high pressure air line 310 to be propelled against the surface of the convex side 240 via a nozzle 324. The shot 322 may act like small ball peen hammers plastically deforming the surface of the convex side 240. The convex side 240 may plastically deform while reducing tensile stresses on the surface of the convex side 240 and cup further in the direction shown by arrow 260 in FIG. 5. Thus, the portion of the blade 140 (e.g., the critical region 220) that is cold worked using shot peening by the shot peening assembly 300 may have a greater degree of curvature or cupping than other portions of the blade 140. In some cases, the degree of cupping may be increased by at least 20%. However, more or less cupping can be achieved based on altering the time period over which the shot 322 is propelled against the surface of the convex side 240, the size of the shot 322, the pressure employed in the high pressure air line 310 or other factors. In an example embodiment, the shot 322 could be embodied as sand, metal, plastic, or other rigid materials. Metal may be used in some cases in order to extend the life of the shot 322, and allow for reuse of shot 322. However, plastic materials may be preferred for the shot 322 in other cases. For example, plastic may abrade surfaces less than metal or sand. Thus, in certain instances, such as when the blade 140 is already painted and/or printed, plastic materials may be advantageous for use as the shot 322. In effect, if the production process includes painting and/or printing the blade 140 before peening, then the use of plastic shot may be preferable.

If shot peening is employed in the critical region 220, the shot 322 may bombard the surface of the convex side 240 from a first end of the critical region 220 to a second and opposite end of the critical region 220. However, unlike mechanical bending, the working of the surface using shot peening does not create a prompt jump or distinct change in the degree of cupping at the first and second ends of the critical region 220. Instead, a gradual transition is formed as the material near the first and second ends of the critical region 220 is gradually altered in its curvature from no increased curvature immediately outside the critical region 220 to full increased curvature at points more distant from the edges and within the critical region 220. The lack of a distinct change in cupping makes the blade 140 less susceptible to catching on the aperture 150, and facilitates easier reeling.

The shot peening assembly 300 may include a single nozzle 324, as shown in FIG. 6A. However, the addition of more nozzles may be helpful in improving throughput in some cases. As such, FIG. 6B illustrates a plurality of nozzles 324 and rollers 326 for conveying the blade 140 proximate to the nozzles 324. As can be appreciated from the shot peening assembly 300' of FIG. 6B, increasing the number of nozzles 324 may correspondingly increase throughput for the system. In this regard, for example, more nozzles 324 may enable the provision of an equal amount of peen to a surface over a higher blade feed rate. Thus, the rollers 326 may convey the blade 140 past the nozzles 324 at a higher speed than the shot peening assembly 300 of FIG. 6A, which only has a single nozzle 324. In some cases, the blade 140 may be printed with markers 327 that indicate specific lengths along the blade 140. A photoeye 328 may be provided to detect the markers 327 and control circuitry 329 may operate the nozzles 324 to apply shot 322 over only selected ranges of the blade 140, as determined from the markers 327. In this regard, the markers 327 could directly indicate start and stop points for peening. Alternatively, the markers 327 may be used by the control circuitry 329 to determine the selected range (e.g., the critical region 220) that is to be peened. For example, if the critical range 220 is from 7 feet to 15 feet, the markers 327 could indicate a start point at 7 feet and a stop point at 15 feet. Alternatively, the markers 327 could indicate foot long intervals and the control circuitry 329 could detect the marker indicating 7 feet to start peening and detect the marker indicating 15 feet and stop peening.

In an example embodiment, the control circuitry 329 may be configured to interface with the rollers 326 to control the feed rate and the orientation of the blade 140 relative to the nozzles 324. The feed rate may be controlled based on the portion of the blade 140 that is passing below the nozzles 324. For example, the feed rate may be high from zero to 7 feet, and then slow down from 7 feet to 15 feet for the application of peening. After the 15 foot point, peening may be stopped and the feed rate may again be increased by the control circuitry 329. This variable feed rate control may enable the control circuitry 329 to minimize the overall processing time and machine capacity while maximizing the effectiveness of cupping that is performed by the peening process. An accumulator may be provided on either side of the nozzles 324 to allow control of the feed rate during the treatment of the entire blade 140. Other parameters may also be adjustable or otherwise controlled by the control circuitry 329. For example, the air pressure in the high pressure air line 310 may be increased or decreased responsive to adjustments implemented by the control circuitry 329. Alternatively or additionally, a valve or other control component may be inserted in the shot line 320, and operated by the control circuitry 329, to enable the amount of shot 322 that is fed into the shot line 320 to be controlled. Thus, the material flow rate into the shot line 320 may be controlled by the control circuitry 329.

As an alternative to shot peening, stress relief operations may be performed by cold working using a bead brush assembly 330 as shown in FIG. 7. In this regard, a rotating shaft 332 may be operably coupled to a rim assembly 334 on which a plurality of beads 336 may be mounted in random or predetermined patterns. As the shaft 332 rotates, the rim assembly 334 may carry the beads 336 rapidly about the axis of rotation of the shaft 332 while the beads 336 are allowed to contact a surface of the convex side 240 of the blade 140 (e.g., at least in the critical region 220). The beads 336 may, like the shot 322 in the example above, impact the surface of the convex side 240 and plastically deform the surface to relieve tensile stresses in the surface. This may increase the surface area of the surface of the convex side 240 to increase cupping in a similar manner to that described above (i.e., without creating a distinct transition point).

As yet another alternative, laser etching of the surface of the convex side 240 of the blade 140 may be accomplished using a laser 340 as shown in FIG. 8. In the example of FIG. 8, the laser etching may remove (e.g., by burning, cutting or vaporization) material from the surface of the convex side 240 to relieve residual stresses on the surface. The laser 340 may be used to remove material in any desirable pattern, and certain patterns may result in better stress relief and or better enhancement of cupping than others. Thus, the laser 340 may be programmed to operate under the control of a controller that is configured to remove material in any desirable pattern that achieves the properties (e.g., the degree of cupping) that are desired for the blade 140. As still another alternative, a water blasting assembly 350 that may use high pressure water to bombard the surface of the convex side 240 to plastically deform and/or remove material to reduce residual stresses on the surface.

Some example embodiments may effectively add, between the first and second non-critical regions 200 and 210, a portion of the blade 140 (e.g., at the critical region 220) that has enhanced cupping or curvature relative to the amount of curvature of the blade 140 in the first and second non-critical regions 200 and 210. The width of the blade 140 in the critical region 220 may be slightly less than the width of the blade 140 in the first and second non-critical regions 200 and 210 due to the increased curvature of the blade 140 in the critical region 220. However, the thickness of the blade 140 may effectively remain unchanged, or at least any material removal or plastic deformation may only create negligible changes to the thickness of the blade 140 in the critical region 220.

Although the area of enhanced cupping (e.g., in the critical region 220) may not experience a rapid or prompt change in the amount of cupping at ends of the critical region 220 due to a gradual change in cupping being experienced at these points, the amount of cupping may otherwise be substantially similar over interior portions of the critical region 220 (e.g., portions thereof that are spaced apart from the respective opposing ends). However, if desired, the amount of cupping could be increased even further at specific portions of the critical region 220 to achieve a non-uniform amount of cupping within the critical region 220. Additionally or alternatively, the entire length of the blade 140 (or a substantial portion thereof) may be treated to increase the amount of cupping in the manner described herein.

Figure 10:
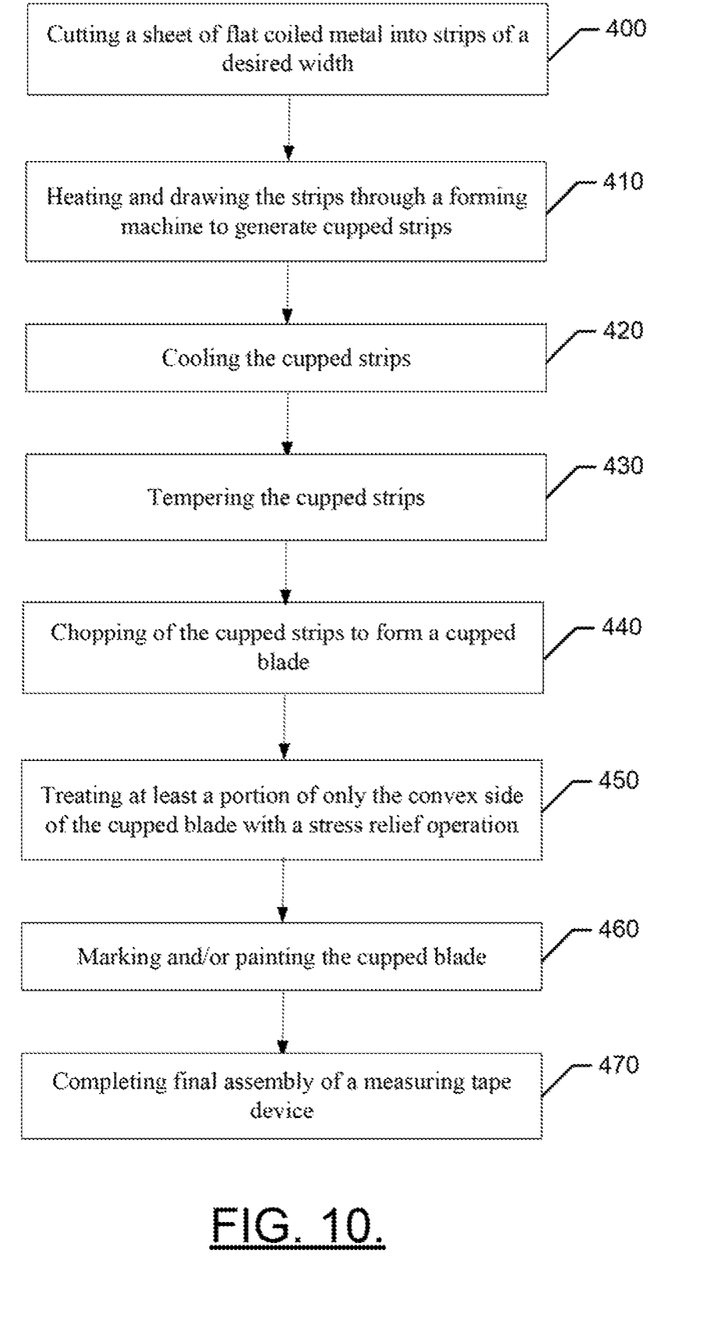
FIG. 10 illustrates a method of making a measuring tape device having an improved blade standout in accordance with an example embodiment.

FIG. 10 illustrates a block diagram for a method of producing a tape measuring device in accordance with an example embodiment. As shown in FIG. 10, the method may include cutting a sheet of flat coiled metal (e.g., steel) into strips of a desired width at operation 400. As an example, if the metal sheet had a width of 24 inches and the desired width (of the blade 140) is one inch, then 24, one inch strips may be cut at operation 400. The method may include heating and drawing the strips through a forming machine to generate cupped strips at operation 410. The cupped strips may be curved by the forming machine while hot, and may then the cupped strips may be cooled at operation 420. Optionally, the cupped strips may be tempered at operation 430 prior to chopping of the cupped strips (tempered or otherwise) to form a cupped blade at operation 440. The chopping of the cupped strips may cut the cupped strips to the desired length of the tape measuring device for which they will form the blade. For example, the cupped strips may be chopped to 10 ft, 25 ft, 35 ft or 50 ft lengths for respective different measuring tapes. At operation 450, at least a portion of only the convex side of the cupped blade may be treated with a stress relief operation. For example, the critical region of the cupped blade may be treated with the stress relief operation. The stress relief operation may enhance the cupping (e.g., the degree of curvature) of the cupped blade in the corresponding portion. Thereafter, the cupped blade may optionally be painted and/or marked at operation 460 prior to final assembly of a measuring tape device (e.g., attaching the cupped blade to a reel assembly and providing the same within a housing and affixing an end hook, etc.) at operation 470.

However, it should be appreciated that the steps or operations associated with processing metal or other materials to achieve the cupped blade may be changed with respect to their specific content or order in some cases. Thus, the method more generally could be stated as providing a cupped blade with substantially uniform cupping over a longitudinal length of the blade and then performing operation 450 (perhaps also followed by operations 460 and 470) on the cupped blade. As such, operations 400 to 440 could be one example of how to provide the cupped blade with the substantially uniform cupping over the longitudinal length of the blade.

In some cases, the method (or portions or operations thereof) may be augmented or modified, or additional optional operations may be included. For example, in some cases, providing the cupped blade with substantially uniform cupping may include cutting a sheet of material into strips of a desired width, heating and drawing the strips through a forming machine to generate cupped strips, cooling the cupped strips, and chopping the cupped strips to a desired length to define the cupped blade. In some cases, providing the cupped blade with substantially uniform cupping may further include tempering the cupped strips prior to chopping the cupped strips. In an example embodiment, applying the stress relief operation may include cold working the selected portion of only the convex side of the cupped blade to plastically deform the selected portion of only the convex side of the cupped blade and increase the curvature of the cupped blade. In some examples, cold working the selected portion may include employing shot peening to plastically deform the selected portion. In some cases, employing shot peening may include modifying air pressure used to drive shot through a shot peening assembly to define different degrees of cupping at different portions of the cupped blade. In an example embodiment, cold working the portion may include employing a bead brush assembly to plastically deform the selected portion. In some examples, applying the stress relief operation may include laser etching the selected portion of only the convex side of the cupped blade to increase the curvature of the cupped blade in the selected portion. In some cases, applying the stress relief operation may include water blasting the selected portion of only the convex side of the cupped blade to increase the curvature of the cupped blade in the selected portion. In an example embodiment, the cupped blade may include a first end and a second end. The cupped blade may also include a first non-critical region from the first end to a start of a critical region, and a second non-critical region extending from the second end to an end of the critical region. Applying the stress relief operation to the selected portion may include applying the stress relief operation to the critical region. Example embodiments may therefore increase blade standout. However, since there is a transition zone between areas having different amounts of cupping, the ability of the blade to be wound onto the reel assembly is not adversely impacted. As such, a tape measure device that remains easy to use, but which has superior characteristics may be provided.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A method of producing a measuring tape device, the method comprising:
providing a cupped blade with substantially uniform cupping over a longitudinal length of the cupped blade;
applying a stress relief operation to a selected portion of only a convex side of the cupped blade to increase curvature of the cupped blade in the selected portion of the cupped blade; and
operably coupling the cupped blade to a reel assembly and providing the cupped blade and reel assembly within a housing to define the measuring tape device.

2. The method of claim 1, wherein providing the cupped blade with substantially uniform cupping comprises:
cutting a sheet of material into strips of a desired width;
heating and drawing the strips through a forming machine to generate cupped strips;
cooling the cupped strips; and
chopping the cupped strips to a desired length to define the cupped blade.

3. The method of claim 2, wherein providing the cupped blade with substantially uniform cupping further comprises tempering the cupped strips prior to chopping the cupped strips.

4. The method of claim 1, wherein applying the stress relief operation comprises cold working the selected portion of only the convex side of the cupped blade to plastically deform the selected portion of only the convex side of the cupped blade and increase the curvature of the cupped blade.

5. The method of claim 4, wherein cold working the selected portion comprises employing shot peening to plastically deform the selected portion.

6. The method of claim 5, wherein employing shot peening comprises modifying air pressure used to drive shot through a shot peening assembly to define different degrees of cupping at different portions of the cupped blade, or modifying a flow of shot to the shot peening assembly.

7. The method of claim 6, wherein the shot peening assembly comprises a photoeye configured to detect one or more markers on the cupped blade, and wherein employing shot peening is performed based at least in part on detection of the one or more markers.

8. The method of claim 4, wherein cold working the portion comprises employing a bead brush assembly to plastically deform the selected portion.

9. The method of claim 5, wherein applying the stress relief operation is performed after printing or painting the cupped blade, and wherein employing shot peening comprises employing plastic shot to avoid abrasion of paint or printing on the cupped blade.

10. The method of claim 5, wherein employing shot peening comprises modifying a feed rate of the cupped blade proximate to one or more nozzles configured to apply shot to the cupped blade.

11. The method of claim 1, wherein applying the stress relief operation comprises laser etching the selected portion of only the convex side of the cupped blade to increase the curvature of the cupped blade in the selected portion.

12. The method of claim 1, wherein applying the stress relief operation comprises water blasting the selected portion of only the convex side of the cupped blade to increase the curvature of the cupped blade in the selected portion.

13. The method of claim 1, wherein the cupped blade includes a first end and a second end, wherein the cupped blade comprises a first non-critical region from the first end to a start of a critical region, and a second non-critical region extending from the second end to an end of the critical region, and wherein applying the stress relief operation to the selected portion comprises applying the stress relief operation to the critical region.

* * * * *